June 27, 1944.  J. ARCHER  2,352,508

ADJUSTABLE REAMER

Filed Jan. 4, 1943

Inventor
John Archer
By
Watson, Cole, Grindle & Watson
Attorneys.

Patented June 27, 1944

2,352,508

UNITED STATES PATENT OFFICE 2,352,508

ADJUSTABLE REAMER

John Archer, Woodford, England, assignor to English Steel Corporation Limited, Vickers Works, Sheffield, Yorkshire, England Application January 4, 1943, Serial No. 471,295
In Great Britain January 9, 1942

2 Claims. (Cl. 77—76)

This invention relates to adjustable reamers of the type in which the reamer body or stock has a cylindrical socket or hollow that is open at the forward end, the cutters are adjusted radially in slots of the socket wall by a bolt or the like axially movable in the socket and having conical surfaces co-acting with like inclined surfaces on internal projections of the cutters extending into the socket through the slots and undercut portions of the cutter projections are adapted to engage an anchorage associated with the reamer body for the purpose of locking the cutters in the adjusted position. The object of the invention is to provide improvements in the construction and operation of the reamer, particularly in the means for locking the cutters in the adjusted position.

A further object is to provide a construction in which the reamer stock may be integral with its shank and tang and the cutters may be adjusted and locked in the adjusted position without dis-assembling the tool.

Another object is to provide an improved method of manufacture resulting in a robust construction in which all faces of the reamer stock registering with faces of the cutters may be produced by machines, thus eliminating the necessity for hand fitting.

Other objects will become apparent upon a perusal of this specification.

According to the present invention the cutters are secured in the adjusted position by an internal lock adjacent their forward ends and by an external lock at their rear ends, the double lock being conveniently applied by application of the external lock.

Each of the cutters usually has two axially displaced internal projections and the internal lock preferably comprises an undercut or dovetail formation of the forward edge of the forward projection of each cutter co-operating with a bevelled end wall of a passage or aperture leading from the base of the slot in the reamer body in which the cutter is adjustable, a slight axial movement of the cutters in the slots being allowed to enable the lock to be applied and released.

The external lock may comprise a bevelled rear end of each cutter engaged by a corresponding internal end bevel or countersink of a ring encircling the reamer body and movable axially thereon. Preferably the ring is freely movable on a screw thread cut on the reamer body and a nut engaging the screw thread is adapted to move the ring axially, the external diameters of ring and nut being less than the minimum reamer adjustment although, if desired, the internally bevelled ring may be tapped to function also as a nut. When a separate ring and nut are provided friction between them is preferably reduced by a castellated formation of the rear edge of the ring.

The slots for the reception of the cutters are preferably cut in a portion only of the socket wall extending from its exterior towards its interior surface and from the base of each slot two passages or apertures lead to the interior of the socket for the reception of the two projections of the cutter, all these passages being closed at both ends by bridging portions of the socket wall.

These passages or apertures are conveniently cut by turning internal grooves in the socket wall to intersect, or to be intersected by, the slots therein, the inner end of the forward bridging portion being internally bevelled to form an anchorage of the internal lock.

The bridging portions, which form the bases of the slots, not only strengthen the tool but the forward and central bridging portions preferably also provide bearings for cylindrical journal portions of the adjusting bolt. This bolt is formed with a coned portion, between its journal portions, co-acting with the forward internal projections of the cutters and with a second coned portion co-acting with the rear cutter projections. At its rear end the adjusting bolt may be formed with a screwed portion, which may be of less diameter than its journal portions, engaging a tapped extension of the reamer socket.

The two coned portions of the adjusting bolt are preferably isometric.

In the accompanying drawing—

Like reference numerals indicate like parts throughout the drawing.

Figure 1:
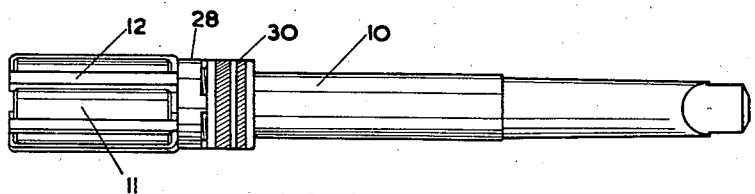
Figure 1 is an elevation, drawn to a smaller scale than the remainder of the drawing, of an adjustable reamer according to the present invention.

The reamer body or stock 10 is integral with its shank and tang and has an open ended socket at its forward end, the wall 11 of which is integral with the body 10. The cutters 12 are adjustable in slots 13 of the socket wall 11 by an adjusting bolt 14 axially movable in the socket and having conical surfaces 15 and 16 co-acting with like inclined surfaces on internal projections 17 and 18 of the cutters 12 extending into the socket through the slots 13.

Figure 6:
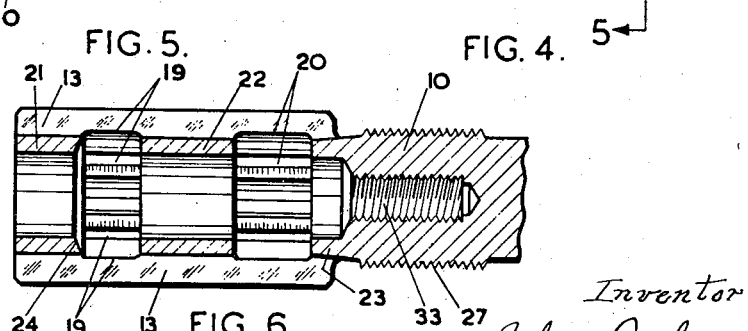
Figure 6 is a view similar to Figure 3 but with the cutters, adjusting bolt and locking rings removed.

As shown most clearly in Figure 6 the slots 13 are cut in a portion only of the socket wall extending from its exterior towards its interior and from the base of each slot 13 two passages or apertures 19 and 20 leading to the interior of the socket are cut for the reception of the two projections 17 and 18 respectively of each cutter 12. This formation of the slots 13 and passages or apertures 19 and 20 leaves bridging portions 21, 22 and 23 of the socket wall 11 extending across the base of each slot 13, closing both ends of all the passages 19 and 20 and integral with the remainder of the body 10. The passages or apertures 19 and 20 are conveniently formed by turning interior grooves in the socket wall and by milling the exterior slots 13 to intersect these grooves.

The inner end of the bridging portion 21 at the forward end of the reamer and closing the forward ends of the passages or apertures 19 is bevelled as shown at 24 conveniently in the turning operation referred to above and the forward edge of the forward internal projection 17 of each of the cutters 12 is undercut or dovetailed as shown at 25 (Figure 3) to the same angle as the bevel 24 so as to engage therewith and form an internal lock for the cutters as hereinafter described.

Figures 2, 3:
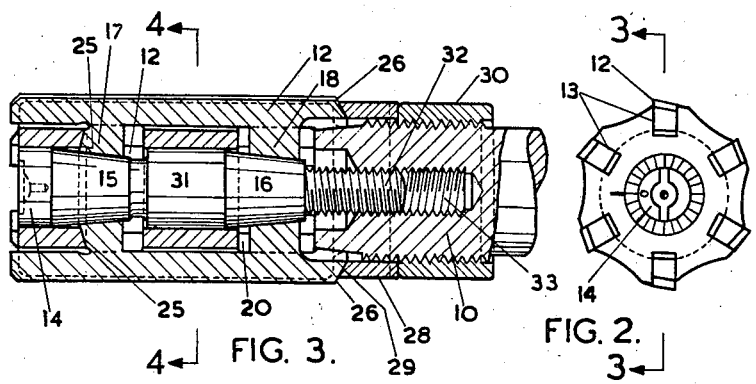
Figure 2 is an end view of Figure 1.
Figure 3 is a longitudinal section on the line 3—3 of Figure 2.
Figures 4, 5:
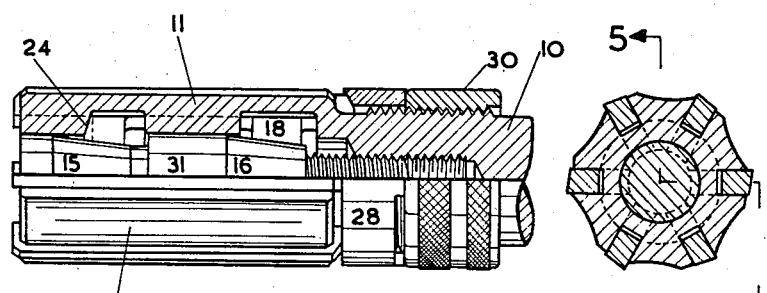
Figure 4 is a transverse section on the line 4—4 of Figure 3.
Figure 5 is a sectional elevation on the line 5—5 of Figure 4.

The rear ends of the cutters 12 extend beyond their rear projections 18 clear of the bases of the slots 13 and these ends are bevelled as shown at 26 in Figure 3, the bevelled ends facing outwardly when the cutters are assembled in the reamer. A screw thread 27 is cut on a cylindrical portion of the reamer body 10 adjacent the base of the socket and a locking ring 28 encircles this portion of the reamer body and is freely slidable in an axial direction on the screw thread 27, or on the adjoining portion of the body. The forward end of the locking ring 28 is formed with an internal bevel 29 of the same taper as the external bevels 26 of the cutters 12 and is adapted to engage those bevels in all their positions of adjustment. A tapped sleeve or nut 30 engages the screw thread 27 and is thus adapted to move the locking ring 28 axially. The external diameters of the locking ring 28 and of the sleeve nut 30 are less than the minimum adjustment of the cutters 12 in order to clear the work. The rear end of the locking ring 28 is preferably of a castellated formation as indicated in Figures 1 and 5 in order to reduce the area of contact between the ring and the nut 30 and to improve alignment between the nut 30 and the locking ring 28, the internal bevel 29 of which determines the setting for the reamer blades 12.

The bridging portions 21 and 22 across the slots 13 in the socket wall 11 form bearings of substantial extent for cylindrical journal portions of the adjusting bolt 14, one of these journal portions 31 being situated between the coned portions 15 and 16 and bearing in the bridging portion 22 whilst the head or forward end of the adjusting bolt provides the other journal portion bearing in the bridging portion 21. At its rear end the adjusting bolt 14 is formed with a screwed portion 32, of less diameter than its journal portions, engaging a tapped extension 33 of the reamer socket.

As shown in the drawing the two coned portions 15 and 16 of the adjusting bolt are preferably isometric, their base diameter conveniently being equal to the diameter of the adjoining journal portion. Thus the cutter projections 17 and 18 may both extend for the same and for a minimum distance.

In Figures 2, 3, 4 and 5 of the drawing the parts are shown with the cutters 12 in or near their most retracted positions and it will be seen that the axial lengths of the passages 19 and 20 are respectively slightly greater than those of the cutter projections 17 and 18. In assembling the reamer the nut 30 and locking ring 28 are retracted (to the right in Figure 3), the adjusting bolt 14 is inserted in the socket and is engaged with the tapped extension 33 and the cutters 12 are inserted in the slots 13 with their internal projections 17 and 18 passing through the passages or apertures 19 and 20 respectively to make contact with the coned portions 15 and 16 of the locking bolt 14. By screwing the sleeve 30 towards the cutters 12 the locking ring 28 will be moved in that direction to bring its internal bevel 29 into contact with the externally bevelled ends 26 of all the cutters 12 which will thereby be moved longitudinally in their slots 13 and passages 19 and 20 until the undercut formations 25 of the forward cutter projections 17 make contact and engage with the anchorage formed by the correspondingly bevelled formation 24 of the forward bridging portion 21 of the socket. In this manner an internal lock is applied to all the cutters 12 and simultaneously an external lock is applied to all the cutters by the contact and engagement of the bevelled locking ring 28 with the rear ends of the cutters, for it will be appreciated that the contacting bevelled surfaces all apply an internally directed radial force to the cutters thereby holding them firmly to the conical portions of the adjusting bolt.

Retraction of the tapped sleeve 30 and locking ring 28 will release the external locks 26—29 and will enable the cutters to move in the same direction to release the internal locks 24—25 thereby enabling all the cutters to be moved radially outwards by actuating the adjusting bolt 14. After the desired adjustment has been made the sleeve 30 is again screwed towards the cutters to apply simultaneously both the external and the internal locks.

In an alternative method of adjustment the screwed sleeve 30 may first be retracted to the requisite position and then the cutters 12 may all be moved radially outwards by tightening the adjusting bolt 14, 32 thereby simultaneously applying both the internal and the external locks to all the cutters as they engage the locking ring 28.

What I claim is:

1. In an adjustable reamer the combination of a stock having a cylindrical socket at one end with mutually intersecting external longitudinal slots and internal circular grooves cut in the socket wall, the intersections of slots and grooves forming separated passages leading from the base of each slot to the interior of the socket and the ungrooved imperforate parts of the socket wall forming end and intermediate bridging portions across the slots and also providing end walls closing both ends of all the passages, cutters in such slots having projections located in such passages, the forward edge of the forward projection of each cutter having an undercut formation co-operating with a bevelled end wall of the passage in which that projection is located, an adjusting bolt movable axially in the socket, having journal portions bearing in the imperforate bridging portions and having coned portions co-acting with the cutter projections and an external lock between the cutters and the stock adjacent their rear ends.

2. In an adjustable reamer, a stock having a cylindrical socket open at one end, having slots for the reception of radially adjustable cutters cut in a portion only of the socket wall extending from its exterior towards its interior surface, having two separated passages leading from the base of each slot to the interior of the socket and having imperforate bridging portions of the socket wall extending across the slots providing end walls closing both ends of all the passages and also providing continuous bearings for a cutter adjusting bolt.

JOHN ARCHER.